United States Patent
Bulthuis et al.

(10) Patent No.: US 7,555,180 B2
(45) Date of Patent: Jun. 30, 2009

(54) OPTICAL BRANCHING COMPONENT WITH LOW POLARISATION SENSITIVITY AND INCREASED PROCESS TOLERANCE

(75) Inventors: Hindrick Freerk Bulthuis, Edinburgh (GB); Frederick Marcel van der Vliet, Pasadena, CA (US); Gunter Beelen, Zoutleeuw (BE); Jamie Suarez Pandavenes, Oviede (ES)

(73) Assignee: Gemfire Europe Limited, Livingston (GB)

( * ) Notice: Subject to any disclaimer, the term of this patent is extended or adjusted under 35 U.S.C. 154(b) by 159 days.

(21) Appl. No.: 10/536,570

(22) PCT Filed: Nov. 27, 2003

(86) PCT No.: PCT/GB03/05190

§ 371 (c)(1),
(2), (4) Date: Mar. 30, 2006

(87) PCT Pub. No.: WO2004/049026

PCT Pub. Date: Jun. 10, 2004

(65) Prior Publication Data

US 2006/0188197 A1 Aug. 24, 2006

(30) Foreign Application Priority Data

Nov. 27, 2002 (GB) ................................. 0227585.7

(51) Int. Cl.
*G02B 6/26* (2006.01)
*G02B 6/42* (2006.01)

(52) U.S. Cl. .............................. 385/42; 385/28; 385/30; 385/32; 385/39

(58) Field of Classification Search .................... 385/27, 385/28, 39, 42, 30, 32
See application file for complete search history.

(56) References Cited

U.S. PATENT DOCUMENTS 5,044,715 A 9/1991 Kawachi et al. ................ 385/42

(Continued)

FOREIGN PATENT DOCUMENTS

EP 0 382 461 8/1990

(Continued)

OTHER PUBLICATIONS

Hashizume Y et al. "Integrated polarisatoin beam splitter using waveguide birefringence dependence on waveguide core width" Electronis Letters, IEE Stevenage, GB, vol. 37, No. 25, Dec. 6, 2001, pp. 1517-1518, XP006017649 ISSN: 0013-5194 sections "Design", "Experimental results"; figure 1.

(Continued)

*Primary Examiner*—Sung H Pak
*Assistant Examiner*—Daniel Petkovsek
(74) *Attorney, Agent, or Firm*—Warren S. Wolfeld; Haynes, Beffel & Wolfeld LLP

(57) ABSTRACT

An optical branching component particularly suitable for use as a tap device is described. The component has two optical waveguides coupled between two optical couplers which each include at least one MMI supporting at least two guided modes. There is an effective optical path length difference between the two waveguides and the coupling strength of at least one of the couplers monotonically decreases with increasing wavelength in the operational wavelength region of the component. This means a coupler with relatively large coupling strength and relatively low polarization dependency can be used in the component, giving low polarization dependent variation in the tap ratio, particularly for small tap ratios. Moreover, the use of MMIs in the couplers avoids the need to fabricate to a high process tolerance very small gaps between two waveguides, as can be the case with directional couplers used in prior art branching component designs.

20 Claims, 7 Drawing Sheets

U.S. PATENT DOCUMENTS

| | | | |
|---|---|---|---|
| 5,165,001 | A | 11/1992 | Takagi et al. |
| 6,084,992 | A * | 7/2000 | Weber et al. .................. 385/24 |
| 6,631,223 | B2 * | 10/2003 | Arai et al. ..................... 385/24 |
| 6,922,510 | B2 * | 7/2005 | Hatanaka ..................... 385/50 |
| 2001/0051018 | A1 | 12/2001 | Arai et al. ..................... 385/24 |
| 2003/0039461 | A1 * | 2/2003 | How Kee Chun et al. ... 385/140 |
| 2003/0165295 | A1 * | 9/2003 | Doerr .......................... 385/39 |
| 2004/0234199 | A1 * | 11/2004 | Melloni et al. ................ 385/32 |

FOREIGN PATENT DOCUMENTS

| | | |
|---|---|---|
| EP | 0 610 973 | 8/1994 |
| JP | 07281041 | 10/1995 |
| WO | WO 2004/017112 A1 | 2/2004 |

OTHER PUBLICATIONS

Lai Q et al. "Tunable wavelength-selection switch and multiplexer/demultiplexer based on asymmetric silica-on-silicon Mach-Zehnder interferometer" Electronics Letters, IEE Stevenage, GB, vol. 34, No. 3, Feb. 5, 1998 pp. 266-267, XP006009267 ISSN: 0013-5194.

Besse P A et al. "Optical Bandwidth & Fabrication Tolerances of Multimode Interference Couplers" Journal of Lightwave Technology, IEEE. NY, US, vol. 12, No. 6, Jun. 1, 1994 pp. 1004-1009, XP000484218 ISSN: 0733-8724, sections II, III; fig. 1,3.

Hong J-K, Kim J-H, Lee S-S: "Low-power thermooptic silica-on-cilicon MZI switch using multimode interference couplers" Silicon-Based & Hybrid Optoelectronics IV, SPIE Proceedings, vol. 4654, Mar. 28, 2002 pp. 157-163, XP002277219.

Soldano L B et al: "Optical Multi-Mode Interference Devices Based on Self-Imaging: Principles & Applications" Journal of Lighwave Technology, IEEE. NY, US, vol. 13, No. 4, Apr. 1, 1995, pp. 615-627, XP000513578 ISSN: 0733-8724, sections IV-VI; fig. 4.

Lee CC et al: "2 X 2 Single-Mode Zero-Gap Directional-Coupler Thermo-Optic Waveguide Switch on Glass" Applied Optics, Optical Society of America, Washington, US, vol. 33, No. 30, Oct. 20, 1994, pp. 7016-7022, XP000476203 ISSN: 0003-6935 section 2; fig. 4.

Soldano L B et al: "Large Optical Bandwidth of INGAASP/INP Multi-Mode Interference 3-DBcouplers" Proceedings Europena Conference on Integrated Optics with Technical Exhibition, 1993, pp. 1-4, XP000522450.

Jinguji K. et al., "Two-Port Optical Wavelength Circuits Composed of Cascaded Mach-Zehnder Interferometers with Point-Symmetrical Configurations" Journal of Lightwave Technology, vol. 14(10), 1996, pp. 2301-2310.

* cited by examiner

OPTICAL BRANCHING COMPONENT WITH LOW POLARISATION SENSITIVITY AND INCREASED PROCESS TOLERANCE

This is a national stage entry under 35 U.S.C. 371 of PCT/GB2003/005190 filed 27 Nov. 2003, which is based on Great Britain Patent Application No. 0227585.7 filed 27 Nov. 2002, the benefit of which is claimed under 35 U.S.C. 119.

The present invention relates to optical branching devices, in particular optical branching devices provided in planar lightguide circuits (PLCs). More specifically, though not exclusively, the invention concerns an optical branching device having low polarisation dependent loss (PDL) for use as a tap device.

Optical branching components, also known as optical couplers, are well known and used in PLC technology. Different types of optical couplers exist, including directional couplers (such as shown in FIG. 6), MMI couplers and Y-branch couplers. Directional couplers tend to have lower power loss than Y-branch couplers, but have higher wavelength dependency i.e. variation in the coupling strength with different input signal wavelengths.

U.S. Pat. No. 5,044,715 describes an improved optical branching component, based on a Mach-Zender interferometer arrangement and which is designed to have low wavelength dependency. FIG. 1 illustrates this component which comprises two waveguides which are brought into proximity with each other in two regions so as to form two directional couplers, there being an effective optical path length difference between the two waveguides where they extend between the two directional couplers. This effective optical path length difference is arranged to be less than the shortest operating wavelength of the branching component, and the directional couplers are each designed so that the coupling strength, C (where $C=\sin^2\phi$, as described hereinbelow), of each directional coupler monotonically increases with increasing wavelength in the operational wavelength region of the component, as illustrated in the graph in FIG. 2. Such a design is proposed to have low wavelength dependency and is sometimes referred to as a Wavelength Insensitive Coupler or WINC.

A desired application of a branching device like that described in U.S. Pat. No. 5,044,715 is as an optical tap, to tap off a desired portion of the power in an optical signal input to the branching device. One disadvantage of using such a component as a tap is that the coupling strength of the individual directional couplers needs to be quite small for small tap ratios (where the tap ratio=$P_{tap}/(P_{tap}+P_{express})$, where $P_{tap}$ is the output power in the tap path, and $P_{exp}$ the output power in the express path). A big disadvantage of small coupling strengths is that a parameter which we refer to as the Relative Birefringence Error (RBE) becomes large, in particular where the PLC chip is fabricated in silica-on-silicon technology (which is a common technology platform for PLCs). A large RBE gives a large polarization dependence in the split ratio (where the "split ratio, $P_{split}$" of an individual coupler is defined as $P_{split}=P_1/(P_1+P_2)$ where $P_1$ and $P_2$ are the power in the two output arms of the coupler respectively). When two couplers are combined in a Mach-Zender configuration this manifests itself as a high polarisation dependent deviation (>±0.2%) in the tap ratio. This polarization dependence in the tap ratio we shall refer to as the Polarization Dependent Loss or PDL of the tap channel, but it will be understood that strictly speaking the total power in the component is conserved, it is simply that the power in the tap channel is polarisation dependent.

This polarization dependence can cause significant problems for systems designers who wish to design such tap components into their systems. Component designers are continually trying to improve the performance specifications of PLC components, especially polarization dependency in such components.

Our pending UK patent application No. 0219141.9, the entire contents of which are hereby incorporated herein by reference, describes a branching component having low polarisation dependent loss (PDL) in the tap channel. This device has a similar structure to the WINC device of U.S. Pat. No. 5,044,715 in that it comprises two waveguides which are brought into proximity with each other in two regions so as to form two directional couplers, there being an effective optical path length difference between the two waveguides where they extend between the two directional couplers. However, in this device the two DCs each have a coupling strength which decreases monotonically with increasing wavelength, in the operating wavelength region of the device. This component, which we refer to as a polarisation insensitive coupler (PINC), tends to have a very small gap between the coupled waveguides of each directional coupler. One disadvantage of this is that there are processing issues associated with the fabrication of this small gap i.e. it is difficult to repeatedly and accurately fabricate the required small gap size.

It is an aim of the present invention to avoid or minimise one or more of the foregoing disadvantages.

According to a first aspect of the invention there is provided an optical branching component comprising two optical waveguides coupled between two optical couplers, wherein there is an effective optical path length difference between the two waveguides, and wherein each said optical coupler comprises at least one multi-mode interference (MMI) waveguide configured to support at least two guided modes, and the coupling strength of at least one said optical coupler monotonically decreases with increasing wavelength in the operational wavelength region of the component. Preferably, the coupling strength of each of the optical couplers monotonically decreases with increasing wavelength in the operational wavelength region of the component.

An advantage of the inventive component, especially where the branching component is to be used as a tap, is that optical couplers with larger coupling strength can be used in the inventive component than the DCs used in the WINC component of U.S. Pat. No. 5,044,715, for a given tap ratio. These larger coupling strength couplers can be fabricated in silica-on-silicon technology to have a lower RBE than the prior art WINC, as will be later described, which in turn enables lower PDL to be achieved.

Moreover, a further advantage is that by using single core waveguides in the form of MMI waveguides, processing issues related to fabricating the small gap between the two coupled waveguides of each directional coupler in the PINC component of our pending UK application No. 0219141.9 are avoided.

Each optical coupler may conveniently comprise an MMI coupler. Preferably, the MMI waveguide in each MMI coupler is configured to support only two guided modes. Such couplers are referred to as two-mode interference (TMI) couplers. MMI waveguides which support a limited number of additional higher order modes are alternatively possible but have been found to give poorer device performance. MMI waveguides and MMI couplers are well known in the art and are described in detail in, for example, Optical Multi-mode Interference Devices Based on Self-Imaging: Principles and Applications" by L. B. Soldano et al, Journal of Lightwave Technology, Vol 13, no. 4, April 1995.

The geometry of each TMI coupler is preferably chosen so that a desired minimum polarisation dependence is achieved for each individual TMI coupler. This in general results in relatively strong couplers. The effective optical path length difference between the two waveguides coupled between the TMI couplers, together with the exact coupling strength of each coupler, may then also be optimised by the component designer, if desired, so as to minimise any wavelength sensitivity of the device in a given operational wavelength window of the device. For example, the effective optical path length difference, at a given operating wavelength (e.g. the lowest operating wavelength, or the central operating wavelength), may be chosen so that the wavelength sensitivity of the TMI couplers is substantially offset by the wavelength sensitivity of the optical path length difference, over the operating wavelength window of the device.

Further inventive features of the invention are set out in the claims.

Instead of a TMI coupler, one or both of the optical couplers in the branching component may comprise a hybrid coupler design, based on a combination of a directional coupler (DC) and an MMI coupler. Examples of such hybrid designs are shown in FIGS. 12(a) to (c). Thus, according to a further aspect of the invention there is provided an optical coupler comprising two optical waveguides which bend away from one another along at least a portion of their lengths and which are coupled together along at least a portion of their lengths by at least one MMI waveguide which is configured to support at least two guided modes, and which are in proximity with one another in at least one region adjacent the MMI waveguide in which region the waveguides are substantially straight. The or each said MMI waveguide is preferably a TMI waveguide.

This new coupler design has a reduced dependence on waveguide core width variations caused by, for example, process variations during fabrication.

According to another aspect of the invention there is provided an optical branching component comprising two optical waveguides coupled between two optical couplers, wherein there is an effective optical path length difference between the two waveguides, and wherein each said optical coupler comprises a multi-mode interference (MMI) waveguide configured to support at least two guided modes, and each said optical coupler is optimised to achieve a minimum polarization dependency of the said optical coupler.

Preferred embodiments of the invention will now be described by way of example only and with reference to the accompanying drawings in which.

Figure 12A:
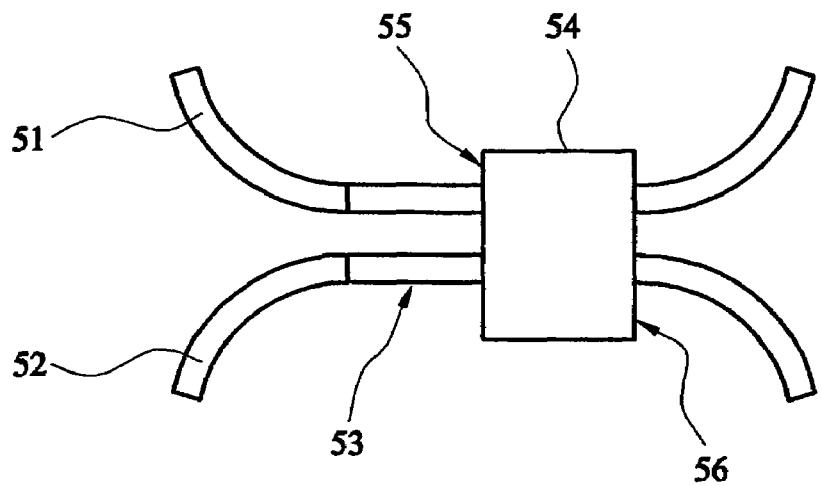
Figure 12B:
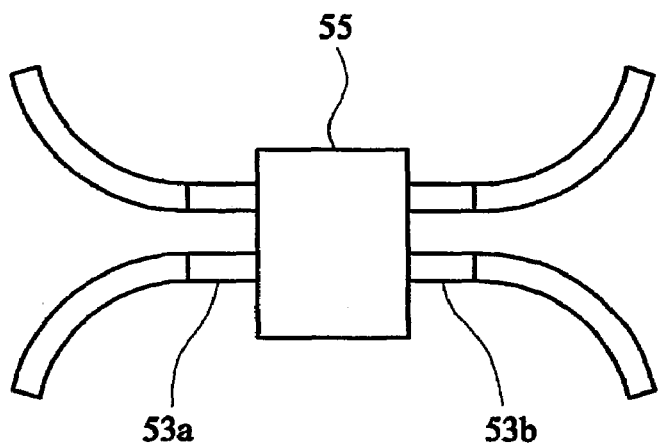
Figure 12C:
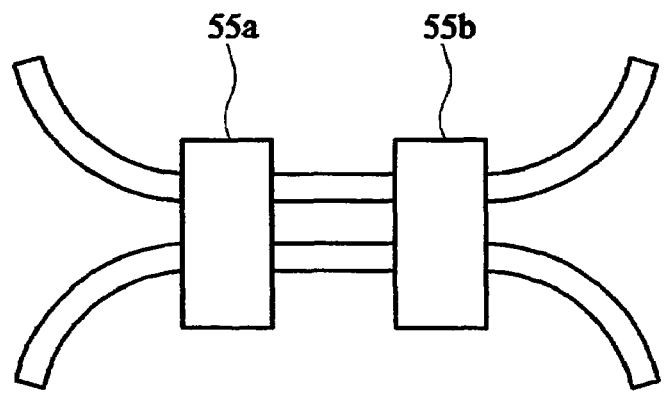

FIGS. 12(a) to (c) show schematic plan views of three example optical coupler designs according to another aspect of the invention.

Figure 13:
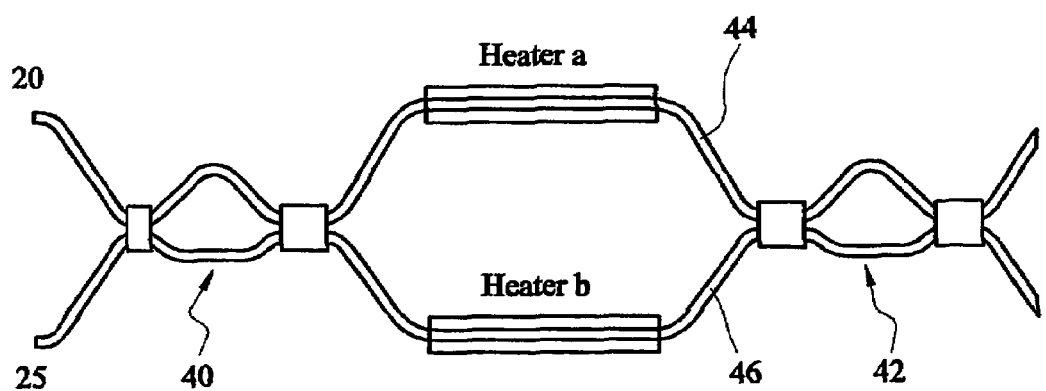

FIG. 13 is a schematic plan view of a switching element according to another embodiment of the invention.

Figure 3:
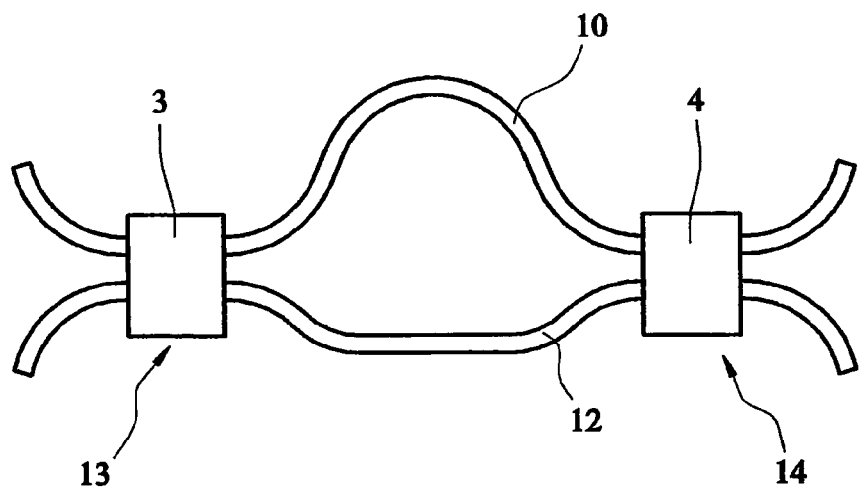
FIG. 3 is a schematic plan view of an optical branching component according to the present invention.
Figure 5:
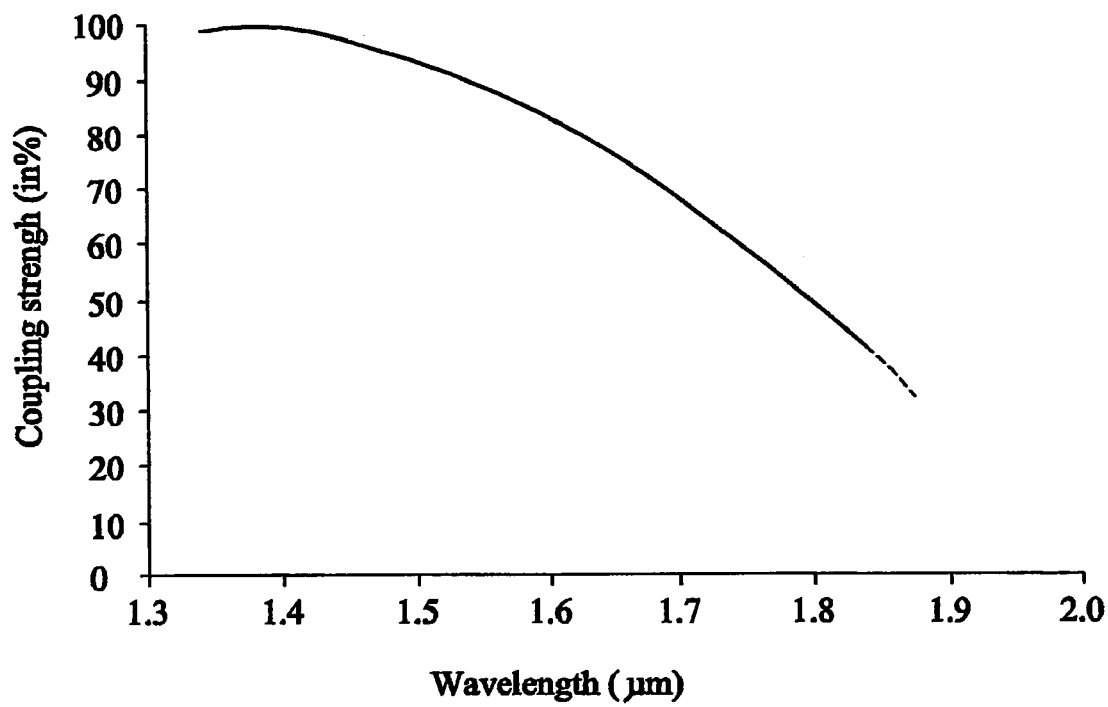
FIG. 5 is a graph illustrating the variation in the coupling strength of each MMI coupler in the inventive component of FIG. 3.

FIG. 3 illustrates an optical branching component (or "optical coupler") according to one embodiment of the invention. The component comprises two different length waveguides 10,12 which are coupled between two MMI couplers 13,14. The MMI couplers are each based on a directional coupler (DC) design in which the central portion of the "dual waveguide core" DC has been replaced with a single core waveguide in the form of an MMI waveguide. Each MMI coupler thus comprises an MMI waveguide 3,4, two diverging input waveguides 1,2 coupled to an input side of the MMI waveguide, and two diverging output waveguides 5,6 coupled to an output side of the MMI waveguide. Each MMI waveguide is configured to support only two guided modes. Such couplers are known as Two-mode Interference (TMI) couplers. The two different length waveguides 10,12 each have one end integrally connected to a respective one of the output waveguides 5,6 of one MMI coupler 13 and an opposite end integrally connected to a respective one of the input waveguides 1,2 of the other MMI coupler 14. In the embodiment of FIG. 3 all the waveguides are made of identical materials and all, except for the MMI waveguides, are single mode, or substantially single mode, waveguides having the same geometrical structure (i.e. dimensions of the core). There is an effective optical path length difference, nΔL, between the two waveguides 10,12 which extend between the two TMI couplers 13,14, where ΔL is the physical length difference between the two waveguides and n is the (effective) refractive index of each waveguide. In contrast to the WINC device of FIG. 1, in the device according to the present invention the TMI couplers are designed so that the (power) coupling strength of each of the two TMI couplers decreases monotonically with increasing wavelength, in the operating wavelength region of the device, as illustrated in FIG. 5 and as will be later explained in detail.

Figure 4A:
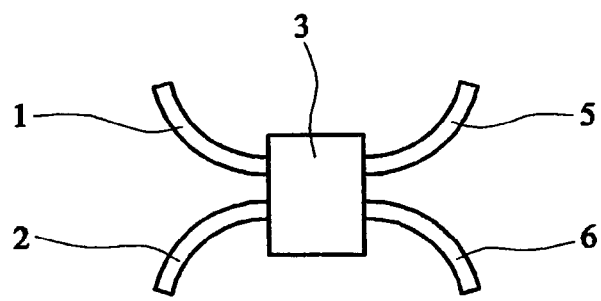
FIG. 4(a) is a schematic plan view of an MMI coupler.
Figure 4B:
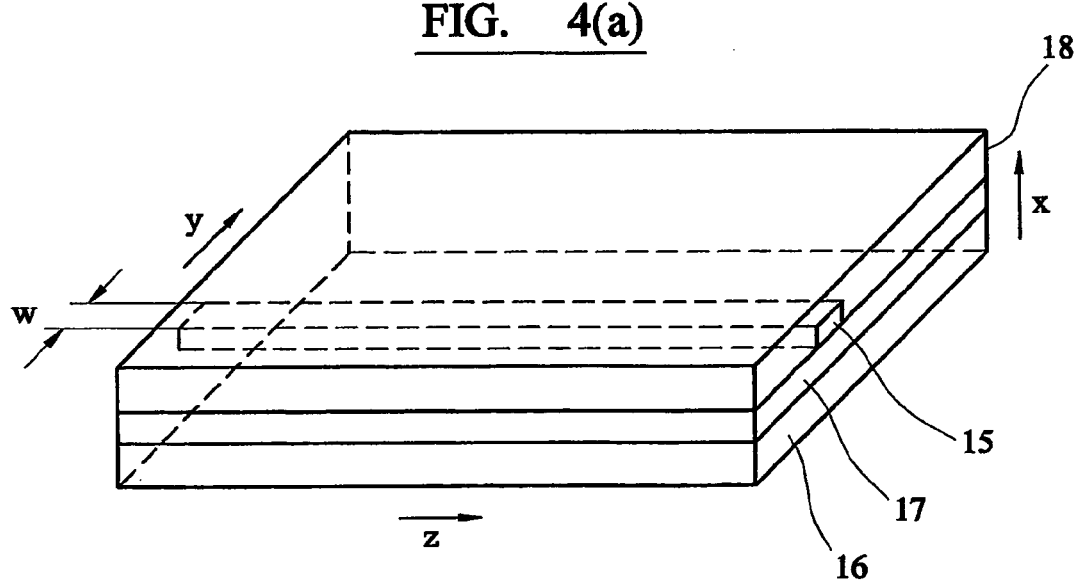
FIG. 4(b) is a perspective view of a portion of a waveguide in the component of FIG. 3.

The optical waveguides are silica-based waveguides formed on a silicon substrate using silica-on-silicon technology. FIG. 4 shows a portion (along the length) of such a waveguide comprising a core 15 etched from a core layer of silica-based material deposited on a silicon substrate 16 using Flame Hydrolysis Deposition. An undercladding layer 17 is commonly provided on the silicon substrate, prior to deposition of the core layer, and may be in the form of an oxide layer or a layer of silica-based material. An upper cladding layer 18 covers and embeds the waveguide core and is formed using Flame Hydrolysis Deposition. In the preferred embodiment the core 15 is square in cross-section, having a core width, w (in the x and y-directions in FIG. 4)

Figure 1:
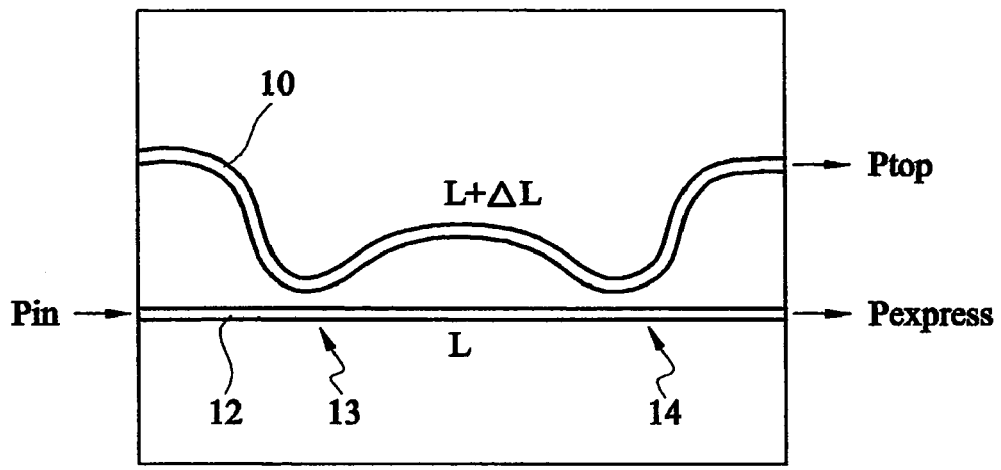
FIG. 1 is a schematic plan view of a prior art VINC component, on a PLC.
Figure 2:
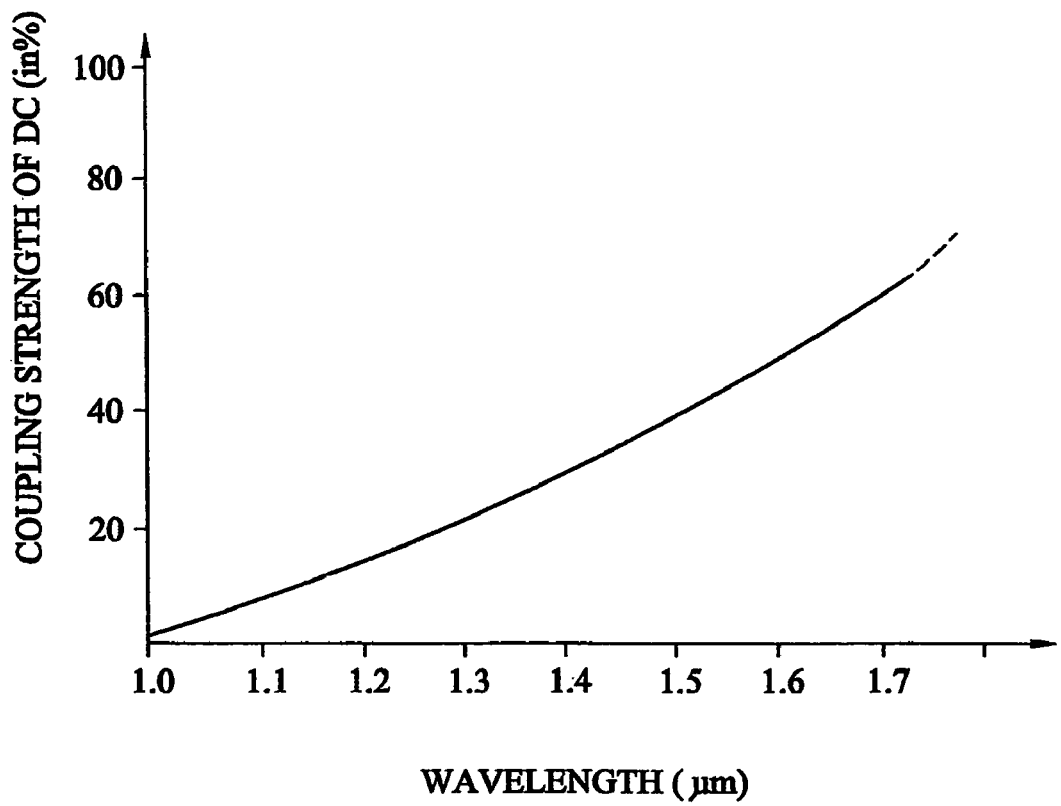
FIG. 2 is a graph illustrating the variation in the coupling strength of each directional coupler in the prior art WINC component of FIG. 1, with variation in wavelength.

It can be shown that a quantity which we refer to as Relative Birefringence Error (RBE) heavily influences the performance of an optical coupler based on a Mach-Zender interferometer arrangement incorporating two directional couplers, like the devices illustrated in FIG. 1. The RBE can be used as a convenient indicator of the polarisation dependent phase thickness of a coupler and we define the RBE as follows.

Definition of RBE

The performance of a directional coupler (DC) is determined by the overall phase thickness of the coupler. In the case of a symmetrical coupler comprising a continuously varying waveguide structure (in terms of the gap between the two waveguides, and core width of the waveguides), for example the DC shown in FIG. 6, this phase thickness can be defined as half the phase shift between the fundamental and the first order modes in the coupler. This can also be expressed mathematically as:

$$\varphi = \int_{-L/2}^{L/2} |\kappa(G(z))| \cdot dz \text{ with } |\kappa| = k_0 \frac{n_0(k_0) - n_1(k_0)}{2}.$$

where

K is the coupling coefficient at location z in the coupler (as defined in "Optical Integrated Circuits" edited by Nishihara et al., page 42, and on page 60-61, edited by Donelley & Sons company);

$k_0 = 2\pi/\lambda$ is the wave-number in vacuum;

L is the length over which coupling contributes to the overall phase-thickness of the coupler;

$n_0$ is the refractive index of the fundamental mode (of the optical signal beam field);

$n_1$ is the refractive index of the first order mode (of the optical signal beam field); and G(z) is a function defining the width of the gap between the waveguides, as a function of z.

So if the polarization dependence of $n_0-n_1$ is known as a function of the gap and the core width, then the polarization dependence of the phase thickness can be determined from the following:

$$\Delta|\kappa| =$$

$$|\kappa|_{TM} - |\kappa|_{TE} = \frac{k_0}{2} \cdot (n_0^{TM} - n_0^{TE} - (n_1^{TM} - n_1^{TE})) = \frac{k_0}{2} \cdot (n_0^{TM,geo} + \Delta n_0^{TM,\sigma} -$$

$$n_0^{TE,geo} + \Delta n_0^{TE,\sigma} - (n_1^{TM,geo} + \Delta n_1^{TM,\sigma} - n_1^{TE,geo} + \Delta n_1^{TE,\sigma})) =$$

$$\frac{k_0}{2} \cdot (B_0^{geo} + B_0^{\sigma} - (B_1^{geo} + B_1^{\sigma}))$$

where $\Delta|\kappa|$ is the difference between the magnitude of the coupling coefficient for the TM polarisation ($|\kappa|_{TM}$) and the magnitude of the coupling coefficient for the TE polarisation ($|\kappa|_{TE}$); and $B_i^{geo} = n_1^{TM,0} - n_1^{TE,0}$, which is the birefringence of the ith mode due to the geometrical structure (i.e. the dimensions) of the waveguides, and $B_i^\sigma = \Delta n_i^{TM,\sigma} - \Delta n_i^{TE,\sigma}$, which is the birefringence of the ith mode due to stresses in the waveguides.

Assuming the polarization dependent effect to be small compared to the difference in propagation constant [i.e. $k_0$] of the fundamental and first order mode, a convenient relative quantity can de defined as:

$$RBE = \frac{\frac{k_0}{2} \cdot (B_0^{geo} + B_0^{\sigma} - (B_1^{geo} + B_1^{\sigma}))}{\frac{k_0}{2} \cdot (n_0^{TE}(k_0) - n_1^{TE}(k_0))} =$$

$$\frac{(B_0^{geo} + B_0^{\sigma} - (B_1^{geo} + B_1^{\sigma}))}{(n_0^{TE} - n_1^{TE})} \approx \frac{(B_0^{geo} + B_0^{\sigma} - (B_1^{geo} + B_1^{\sigma}))}{(n_0^{TM} - n_1^{TM})}$$

Figure 6:
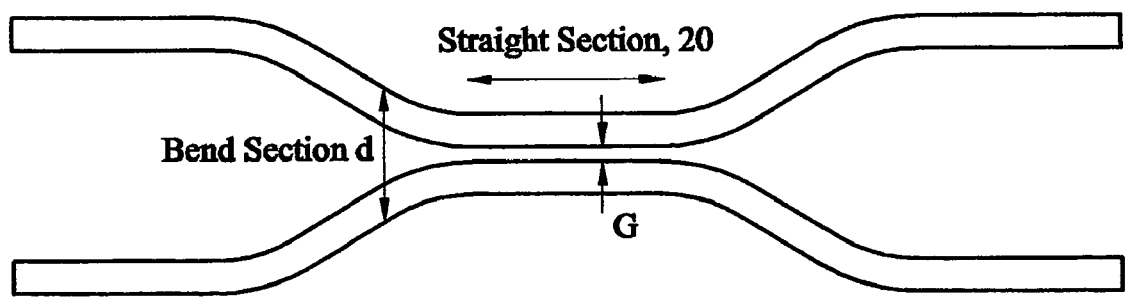
FIG. 6 is a plan schematic view of a directional coupler device.

This is the local RBE in a coupler. Using this definition we obtain an integrated measure of the polarization dependence of the phase-thickness of the coupler:

$$\frac{\Delta\varphi}{\varphi} = \frac{\int_{-\infty}^{\infty} \frac{|\Delta\kappa(G(z))|}{|\kappa(G(z))|} \cdot |\kappa(G(z))| \cdot dz}{\int_{-\infty}^{\infty} |\kappa(G(z))| \cdot dz} = \frac{\int_{-\infty}^{\infty} RBE(G(z)) \cdot |\kappa(G(z))| \cdot dz}{\int_{-\infty}^{\infty} |\kappa(G(z))| \cdot dz}$$

where $\Delta\varphi$ is the difference in phase thickness of the directional coupler, for the two different polarisation modes TM, TE We denote this quantity as the integrated or average RBE ($RBE_{average}$) of a coupler i.e. $RBE_{average} = \Delta\varphi\varphi$. In fact $\Delta\varphi$ will also vary depending on whether the waveguides in the directional coupler are straight or are bent. As shown in FIG. 6, typically the waveguides in a DC bend away from one either on either side of a middle portion 20 of the DC in which the two waveguides are straight and parallel. The waveguides will remain optically coupled in the bent region as they diverge away from one another until they diverge beyond a certain distance apart, d, at which they will no longer be optically coupled. In the bent sections of the coupler, in the example in which the input and output waveguides have circular bends, the gap, G(z), is given by the following equation:

$$G(z) = g_0 - 2R(\sqrt{1-(z/R)^2} - 1), \text{ where R=bend radius}$$

Other Important Definitions include:

Coupling length $L_c$ $$L_c = \frac{\pi}{2} \cdot \frac{1}{\kappa(g_0, w_0)}$$

Phase thickness due to the bend sections $$\varphi_{Bend} = 2 \cdot \int_0^R \kappa(G(z), w_0) \cdot dz$$

Coupling length, $L_B$, of bend section $$L_B = \frac{\varphi_{bend}}{\pi/2} \cdot L_c$$

Figure 7:
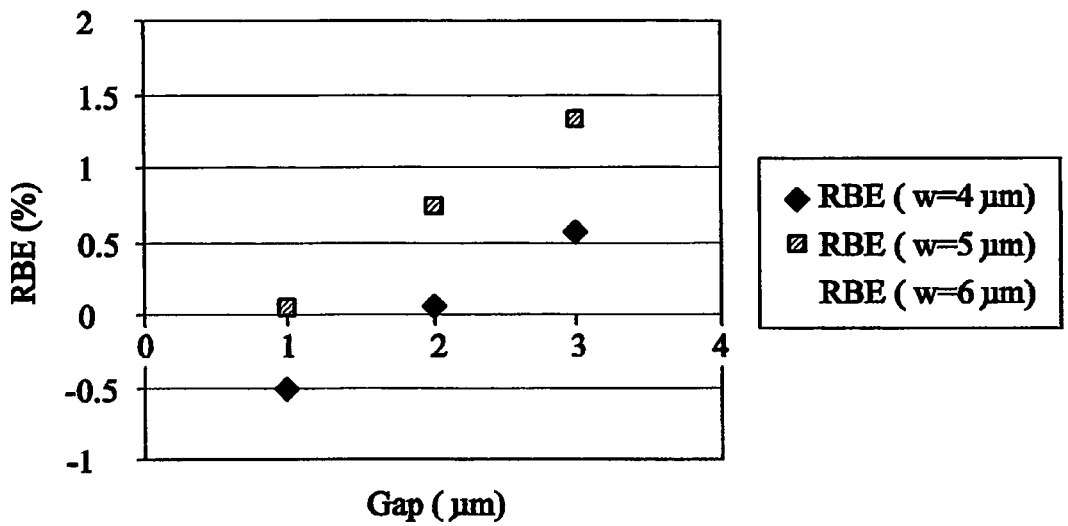
FIG. 7 shows three graphs plotting the RBE as a function of Gap, G, between the two waveguides of the straight section of each directional coupler in a Power Tap device of the Mach-Zender interferometer type shown in FIG. 1, for three different waveguide core widths, based on modal and stress calculations.

FIG. 7 is a graph illustrating the variation in the RBE with the Gap, G, between the two waveguides, for a DC of a Power Tap device of the Mach-Zender interferometer type, in the straight section, $L_S$, of the coupler. Three graphs are shown for three different waveguide core widths, w=4, 5, 6 μm, respectively. These graphs are all based on mode and stress computer simulations. From this it can clearly be seen that the larger the gap, the larger the RBE becomes, and therefore the higher the PDL. This is the case for all three core widths, w. The RBE is also higher, the greater the core width. Our goal is to achieve as low a value of (local) RBE as possible in each section of the coupler, and in particular as low as possible an integrated or average RBE using the equation given above for calculating $RBE_{average}$.

Figure 8:
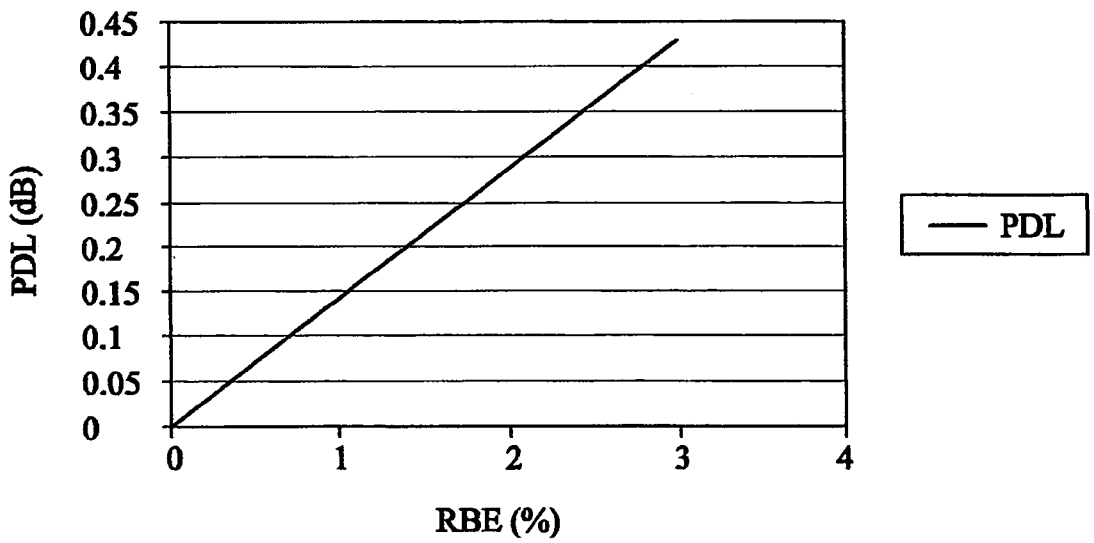
FIG. 8 is a graph plotting the PDL as a function of the RBE in an exemplary Power Tap device of the Mach-Zender interferometer type.

FIG. 8 Shows a graph illustrating the linear relationship between PDL and RBE in a Power Tap of a Mach-Zender interferometer type, where it has been assumed for simplicity that the two DCs have identical RBE. The slope of the graph will depend on the tap ratio and the choice of other device parameters. This graph is again based on mode and stress computer simulations. It can clearly be seen that the PDL increases linearly with increasing RBE, where it is assumed that the birefringence of the delay line is negligible.

In the WINC coupler described in U.S. Pat. No. 5,044,715 it is the case that in order to achieve a low tap ratio, say only a few percent or less, it is necessary to use directional couplers (DCs) with very small coupling strength. This is due to the requirement (for the WINC) that the coupling strength of the DCs must increase monotonically with increasing wavelength. The big disadvantage of DCs having small coupling strengths is that the RBE of such couplers becomes large. Particularly where the waveguides are fabricated in low index contrast technology, such as silica-on-silicon waveguides, the PDL of such WINCs will be large, typically 0.5 dB or higher depending on the gap size. This is largely because to achieve the necessary "monotonically increasing" condition (to give the proposed wavelength insensitivity) the gap, G, between the waveguides in each DC has to be relatively large, typically greater than 3 µm), and so does the width of the waveguide cores, typically a width above the maximum width for a monomode waveguide. As shown above, greater gap sizes, G, and/or greater core width, w, gives larger RBE.

In contrast, in the optical branching device of the invention described in our pending UK application no. 0219141.9, each DC has a coupling strength which decreases monotonically with increasing wavelength, in the operating wavelength region of the device. The advantage of this is that even where a small tap ratio is desired (say a few percent or less), the coupling strength of the DC couplers will be larger than in the WINC device. This means that we can design our DCs to have a smaller gap, G, between the waveguides and/or a smaller waveguide core width, w. Decreasing the gap size and/or the core width increases the coupling strength of the couplers, but as a higher coupling strength is tolerable in our couplers (to achieve a given low tap ratio) this is acceptable. As above-explained, lower gap width G and/or lower waveguide core width, w, will give lower RBE, and hence lower PDL.

In the present invention, as shown in FIG. 3, two MMI couplers are used instead of the two directional couplers respectively. By utilising two MMIs (in particular two-mode interferometers or "TMIs") instead of the straight sections in the two DCs we have effectively reduced the gap between the two waveguides in the straight section of the DC to zero. By eliminating the need for the gap the fabrication of the component is more robust to process changes and the component yield is therefore increased. Mathematically, these TMI couplers can be treated as directional couplers in which the gap size in the straight section has been reduced to zero. The way in which we design the TMI couplers to have a coupling strength which decreases monotonically with wavelength is therefore the same way we describe in our pending UK application No. 0219141.9 for designing a DC to have a coupling strength which decreases monotonically with wavelength and is thus as follows:

The term "coupling strength" with respect to a DC (or TMI coupler) will herein be understood to mean the power coupling strength, C, of the coupler, where C is defined as:

$C = \sin^2\phi$, where $\phi$ is the phase thickness of the DC (or TMI coupler), as already defined above.

In fact, the branching devices of FIGS. 1 and 3 are defined by three parameters:

The phase delay, $2\theta$, between the (two waveguides between the) two couplers;

The phase thickness, $\phi_1$, of the first coupler;

The phase thickness, $\phi_2$, of the second coupler.

The phase delay is related to the effective optical path length difference, $n\Delta L$, between the two couplers, by the following equation:

$$2\theta = 2\pi \cdot n\Delta L/\lambda$$

By choosing an appropriate value of $\theta$ it is possible to try to compensate the wavelength dependence of each coupler by the wavelength dependence of the phased delay $2\theta$. This can be best explained by looking at the situation where two identical couplers of phase-thickness $\phi$ are used. The power coupling strength $C_T$ of the entire Mach-Zender interferometer type branching component is given by:

$C_T = \sin^2(2\phi)\cdot(1+\cos 2\theta)/2$, where two identical DCs are used in the device.

With the required conditions on the WINC device of FIG. 1, that the coupling strength of each DC increases monotonically with increasing wavelength, this sets the possible ranges of values for $\phi$ (e.g. $0 < \phi < 90°$, or $180° < \phi < 270°$). The value of $\theta$ can then be optimised so that the wavelength dependence of the $\sin^2(2\phi)$ term is cancelled by the wavelength dependence of the $(1+\cos 2\theta)/2$ term, so that the total coupling strength, $C_T$, of the WINC device is wavelength insensitive. For example, where $0 < \phi < 45°$ the $\sin^2(2\phi)$ term is increasing with increasing wavelength, so one needs to have $90° < \theta < 180°$ so that the $(1+\cos 2\theta)/2$ term decreases with wavelength. U.S. Pat. No. 5,044,715 proposes that $\theta$ is set close to, but slightly under, $180°$ at the shortest operating wavelength of the device.

The two DCs need not be identical, they may each have a different phase thickness $\phi_1$, $\phi_2$ in which case the total coupling strength, $C_T$, of the WINC is given by:

$$C_T = \sin^2(\phi_1+\phi_2)\cdot(1+\cos 2\theta)/2 + \sin^2(\phi_1-\phi_2)\cdot(1-\cos 2\theta)/2$$

In one embodiment of a branching device according to the present invention, we set the phase thickness of each TMI coupler so that:

$$90° \leq \phi_1 \leq 180°$$

$$90° \leq \phi_2 \leq 180°$$

In this case, the coupling strength, $C = \sin^2\phi$, of each TMI coupler decreases monotonically with increasing wavelength in the operating wavelength region of the component, as illustrated in FIG. 5. With these values of $\phi_1$ and $\phi_2$, we have found that the integrated or average RBE ($RBE_{average}$) of the couplers becomes small, namely less than 1%, possibly close to zero. The small RBE means that the PDL will be low (assuming the birefringence of the delay line is negligible). In order to minimise any wavelength sensitivity, the value of $\theta$ is then also chosen so that again the wavelength sensitivity of the TMI couplers is substantially compensated for by the wavelength sensitivity of the optical path length difference, by using the appropriate above equation defining the total coupling strength $C_T$ of the overall branching device (depending on whether both TMI couplers have identical phase thickness, or not). For example, where both TMI couplers have the same phase thickness, and this phase thickness φ is between 90° and 135°, we would make 90°<θ<180°, whereby again the increase with wavelength of the $\sin^2(2\phi)$ term is substantially compensated for by the decrease with wavelength of the $(1+\cos 2\theta)/2$ term. However, where the phase thickness φ is between 135° and 180° we would want to make 0°<θ<90°, whereby the decrease with wavelength of the $\sin^2(2\phi)$ term is substantially compensated for by the increase with wavelength of the $(1+\cos 2\theta)/2$ term.

In a preferred embodiment of the present invention we have used the following values:

θ=92.9°

φ$_1$=109.5°

φ$_2$=98.0°

Figure 9:
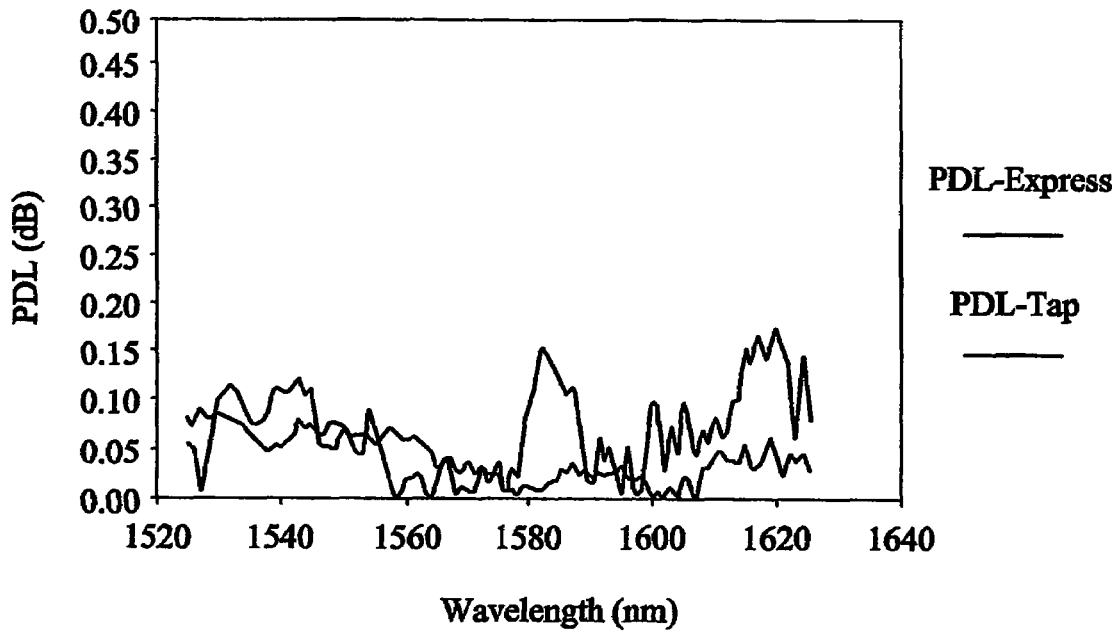
FIG. 9 is a graph illustrating the measured variation in PDL with wavelength, for one embodiment of a PINC-TMI tap component according to the invention.

FIG. 9 is a graph of PDL vs. wavelength, in the wavelength region between about 1520 nm and 1630 nm, for a branching component of the type shown in FIG. 3 and designed as a 4% power tap with an $RBE_{average}$ of 0.4% in each TMI coupler. The lower line shows the PDL for the express signal path through the PINC, and the upper line is for the Tap path. There are many ways to define the PDL, which is a measure of the polarisation dependence of the tap ratio at a given wavelength, but herein we have defined it as the difference between the minimum tap ratio in dB at a given wavelength and the maximum tap ratio in dB at said given wavelength.

Figure 10:
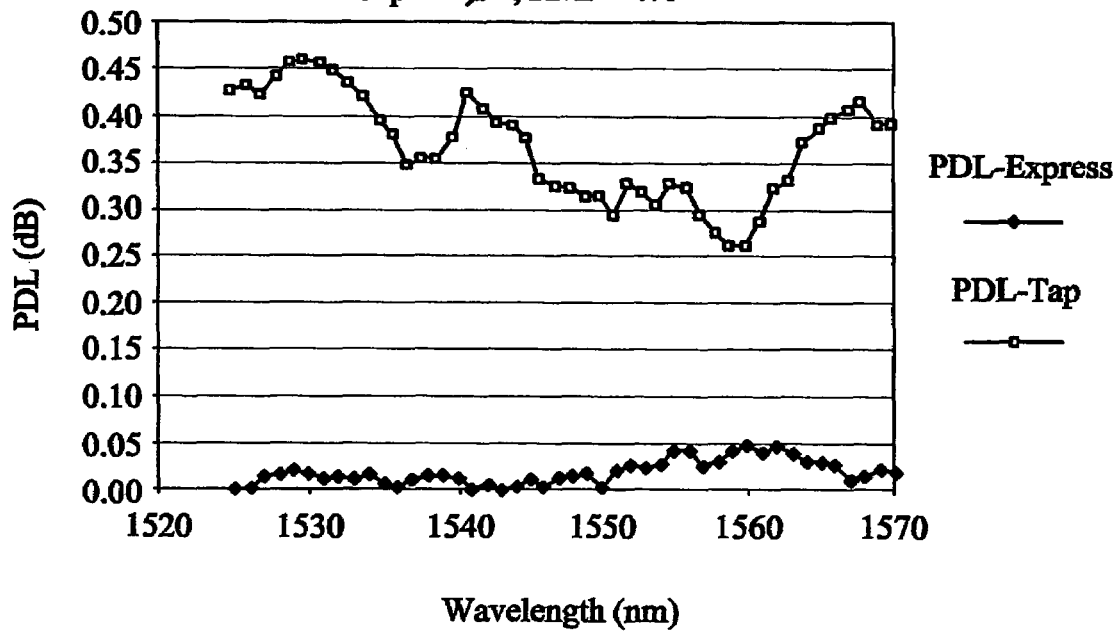
FIG. 10 is a graph illustrating the measured variation in PDL with wavelength, for a prior art type WINC component like that of FIGS. 1 and 2.

The graphs in FIG. 9 were obtained from empirical (i.e. experimental) data. It can be clearly seen that the PDL values are very low, the PDL values in each of the tap path and the express path being less than 0.15 dB. FIG. 10 is a similar graph, again obtained from empirical data, this time plotted for the express and tap paths in a prior art WINC device also designed as a 4% tap, with a gap of 3 μm between the waveguides in the straight section of each directional coupler (DC) of the WINC, and an RBE of 4% for each DC. In this case it can be seen that the PDL values in the Tap path are much higher than in the inventive device of FIG. 9, never being less than 0.25 dB and sometimes being greater than 0.45 dB.

Figure 11:
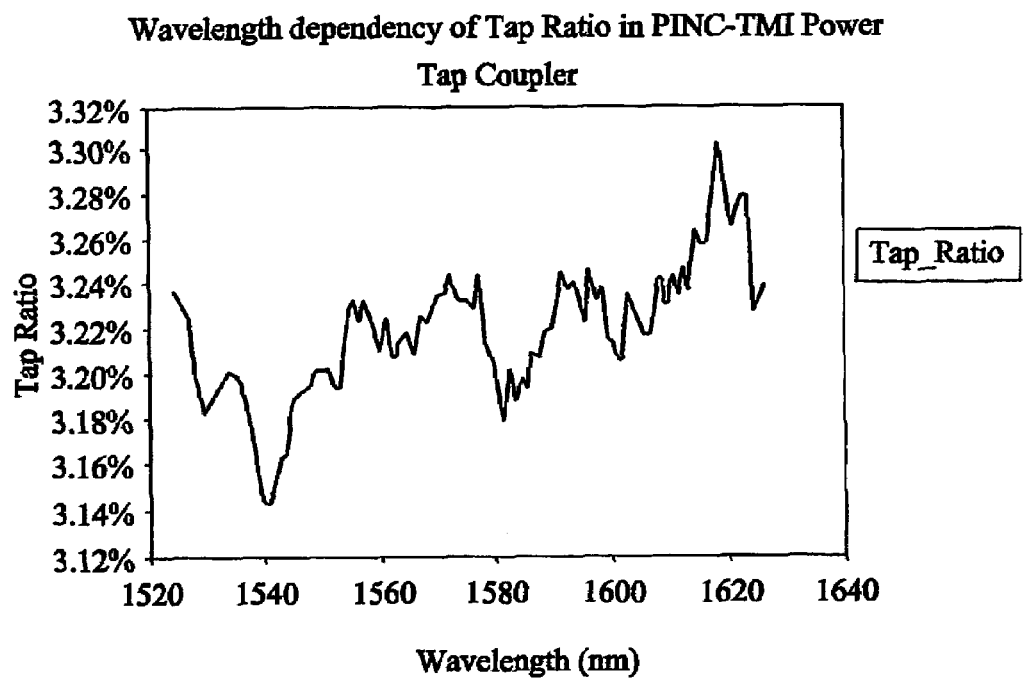
FIG. 11 is a graph illustrating the variation in the tap ratio with input signal wavelength, for the same PINC-TMI tap component as the FIG. 9 graph.

FIG. 11 illustrates the wavelength dependency of an example inventive device of the type shown in FIG. 3. It shows the variation in the Tap ratio of the device as a function of wavelength. This graph is again for an (approx.) 3% tap. The tap ratio over the wavelength range 1520 nm to 1640 nm is 3.2%±0.1% which is relatively low variation. Thus it can be readily seen from FIGS. 9 and 11 that the inventive branching component has very low polarisation dependent loss (PDL) in addition to having a tap ratio which is relatively wavelength insensitive in at least the 1520 nm to 1640 nm region, which is the desired operating wavelength region of our component.

FIG. 12(a) shows an alternative coupler design for use in the inventive branching component. This coupler design is essentially a hybrid of a directional coupler and a TMI coupler. In this hybrid coupler 50, which is based on a directional coupler design, the straight section of the directional coupler comprises a combination of two straight waveguides and a TMI waveguide. The advantage of this coupler design will now be described.

In practice, couplers tend to be dependent on core width variations. Table 1 below shows the dependence of the coupling length, $L_c$, on waveguide core width variations for a traditional "dual core" coupler (i.e. a directional coupler), and also for a "single core" coupler in the form of a TMI coupler.

TABLE 1

| Core width | Variation in $L_c$ | |
|---|---|---|
| variation | DC (dual core) | Single Core Coupler |
| −0.2 | 3.44% | −2.54% |
| −0.1 | 1.74% | −1.27% |
| 0.0 | 0.00% | 0.00% |
| 0.1 | −1.76% | 1.33% |
| 0.2 | −3.54% | 2.65% |

It is clear that the magnitude of the variation in $L_c$ is similar for the dual core coupler and the single core coupler. The sign of the variation however, is opposite. For example, if a wafer were to contain both types of couplers and if all waveguides fabricated on this wafer would in practice be slightly wider than intended by design, the coupling length of a dual core coupler would become slightly smaller, whereas the coupling length of a single core coupler would become slightly larger. Therefore, we propose that if both types of couplers were to be appropriately combined in a hybrid coupler structure the net change in coupling length should be small and thus there will be a reduced dependence on core width variations.

One such combination coupler is the coupler 50 shown in FIG. 12(a). This coupler consists of two optical waveguides 51,52 which are coupled together along a first portion of their lengths by a TMI waveguide 54, and are in proximity with one another in a region 53 adjacent one side 55 of the MMI waveguide in which region the waveguides are substantially straight. On the other side 56 of the TMI waveguide, and on the other side of the straight waveguide region 53, the two waveguides bend away from each other in the same manner as in a conventional directional coupler (i.e. as on either side of the central portion of a conventional DC).

Two further examples of combination couplers are shown in FIGS. 12(b) and (c). In FIG. 12(b) the two waveguides 51,52 form two such straight waveguide regions 53a, 53b one on either side of the TMI waveguide 55. In FIG. 12(c) there are two TMI waveguides 55a,55b coupled end-to-end by a straight waveguide region 53 comprising two straight waveguides. Other higher order mode MMI waveguides could be used instead of TMI waveguides but are not preferred as the device performance will degrade when more than two guided modes are supported.

Various modifications and variations to the above-described embodiments are possible without departing from the scope of the claimed invention. For example, variations in the waveguide dimensions and materials are possible, though may not give as good performance results in terms of the wavelength dependent loss (WDL) and PDL. Moreover, the waveguides need not be made using only FHD and etching technology—other process technologies could be used, for example Chemical Vapour Deposition (CVD).

Alternatively, or additionally, one or more heater elements may be provided on the device, for varying the path length (in response to electrical signal(s) being applied to the heater(s)) of one or more of the waveguides so as to actively control the signal output(s) from the branching component, in known fashion. For example, the use of such heaters can enable the branching component to be used to perform switching operations. FIG. 13 shows one embodiment of a switching device incorporating two branching components 40,42 according to the invention, separated by two delay paths 44,46 formed by the two waveguides of the device respectively, and with a heater a,b provided on each delay path.

Furthermore, at least some of the benefits of the invention can be achieved where only one of the TMI couplers, or hybrid couplers, is designed to have a coupling strength which monotonically decreases with increasing wavelength in the operational wavelength region of the component. In such cases the geometry of both couplers, and the optical path length difference between the two couplers, may still be optimised by the designer so as to achieve a minimum polarisation dependence in the tap ratio for that tap design.

Additionally, although the above-described invention is particularly beneficial for tap components designed to have a small tap ratio it can equally be applied to components having larger tap rations, for example 50% taps or 3 dB couplers.

The invention claimed is:

1. An optical branching component having an operational wavelength region, comprising two optical waveguides coupled between two optical couplers, wherein there is an effective optical path length difference between the two waveguides, and wherein each said optical coupler comprises a multi-mode interference (MMI) waveguide configured to support at least two guided modes, and the coupling strength of at least one said optical coupler monotonically decreases with increasing wavelength throughout the operational wavelength region of the component.

2. An optical branching component according to claim 1, wherein the coupling strength of each said optical coupler monotonically decreases with increasing wavelength in the operational wavelength region of the component.

3. An optical branching component according to claim 1, wherein each MMI waveguide is configured to support only two guided modes.

4. An optical branching component according to any of claim 1, wherein the optical couplers each comprise an MMI coupler.

5. An optical branching component according to claim 4, wherein each of the MMI couplers has the same coupling strength.

6. An optical branching component according to claim 4, wherein each of the MMI couplers has a different coupling strength.

7. An optical branching component according to claim 4, wherein the phase thickness of each said MMI coupler is between 90° and 180°.

8. An optical branching component according to claim 4, wherein the phase thickness of each said MMI coupler is between 90° and 135° and the phase delay, 2θ, between the two waveguides, between said two directional couplers, is defined by 90°<θ<180°.

9. An optical branching component according to claim 4, wherein the phase thickness of each of said two MMI couplers is between 135° and 180 ° and the phase delay, 2θ, between the two waveguides, between said two MMI couplers, is defined by 0°<θ<90°.

10. An optical branching component according to claim 4, wherein the geometry of each MMI coupler is optimized to result; in a minimum integrated RBE ($RBE_{average}$) of the coupler.

11. An optical branching component according to claim 4, wherein the magnitude of the integrated RBE ($RBE_{average}$) of each of said two MMI couplers is less than 1%.

12. An optical branching component according to claim 4, wherein the magnitude of the integrated RBE ($RBE_{average}$) of each of said two MMI couplers is no greater than 0.5%.

13. An optical branching component according to claim 1, wherein said effective optical path length difference is less than the shortest operating wavelength of the component.

14. An optical branching component according to claim 1, wherein the component is a tap device having a tap ratio of no greater than 4%.

15. An optical branching component according to claim 1, wherein the component is a tap device in which the variation in the tap ratio with wavelength is less than 0.1% over the operating wavelength region of the component.

16. An optical branching component according to claim 1, wherein each said optical coupler comprises two optical waveguides which bend away from one another along at least a portion of their lengths and which are coupled together along at least a portion of their lengths by a respective said MMI waveguide, and which are in proximity with one another in at least one region adjacent said respective MMI waveguide in which region the waveguides are substantially straight.

17. An optical branching component according to claim 16, further including a heater disposed on at least one said waveguide.

18. An optical switching device comprising two optical branching components according to claim 1, further including at least one heater.

19. An optical branching component according to claim 1, wherein the effective optical path length difference between the two waveguides is less than the shortest wavelength of the operating wavelength region.

20. An optical branching component according to claim 1, wherein the effective optical path length difference between the two waveguides is less than 1520 nm.

* * * * *